United States Patent
Tazumi et al.

[11] Patent Number: 6,138,804
[45] Date of Patent: Oct. 31, 2000

[54] ONE-WAY CLUTCH AND AUXILIARY MACHINE USING THE SAME

[75] Inventors: Hajime Tazumi, Higashiosaka; Yoshitaka Nakagawa; Junya Ooitsu, both of Kashiwara, all of Japan

[73] Assignee: Koyo Seiko Co., Ltd., Osaka, Japan

[21] Appl. No.: 09/237,912

[22] Filed: Jan. 27, 1999

[30] Foreign Application Priority Data

Jan. 27, 1998 [JP] Japan ............................... P10-013813

[51] Int. Cl.⁷ .................................................. F16D 3/34
[52] U.S. Cl. ............................. 192/45; 192/415; 474/112
[58] Field of Search ............................ 192/45, 45.1, 44, 192/53.1

[56] References Cited

U.S. PATENT DOCUMENTS

| | | | |
|---|---|---|---|
| 1,963,660 | 6/1934 | Greninger | 192/44 |
| 3,084,774 | 4/1963 | Liang | 192/44 |
| 3,324,744 | 6/1967 | Roper | 192/44 |
| 4,852,708 | 8/1989 | Parkhurst | 192/45 |
| 5,279,399 | 1/1994 | Riggle | 192/45 |
| 5,669,476 | 9/1997 | Lederman | 192/45 |
| 5,675,202 | 10/1997 | Zenmei et al. | 192/45 |
| 5,695,031 | 12/1997 | Kurita et al. | 192/45 |
| 5,740,893 | 4/1998 | Yamamoto | 192/45 |

*Primary Examiner*—Charles A Marmor
*Assistant Examiner*—Tisha D. Waddell
*Attorney, Agent, or Firm*—Birch, Stewart, Kolasch & Birch, LLP

[57] ABSTRACT

A one-way clutch for switching between a locking state in which an inner wheel and an outer wheel rotate synchronously, and a free state in which they rotate relative to each other. The one-way clutch includes a holding device having pockets for accommodating rollers provided at several positions on its circumference, and coil springs which are accommodated in each of the pockets in a compressed state for urging the rollers to a locking side of a pocket. The coil springs are in contact at points which span over ½ the width of the roller in the axial direction of the roller. As a result, a balanced urging force of the coil spring can be supplied to the roller, so that the rollers rotate smoothly and with a proper posture. Deflection of the coil springs is inhibited by alignment portions included at a surface of each pocket.

18 Claims, 7 Drawing Sheets

F I G. 6
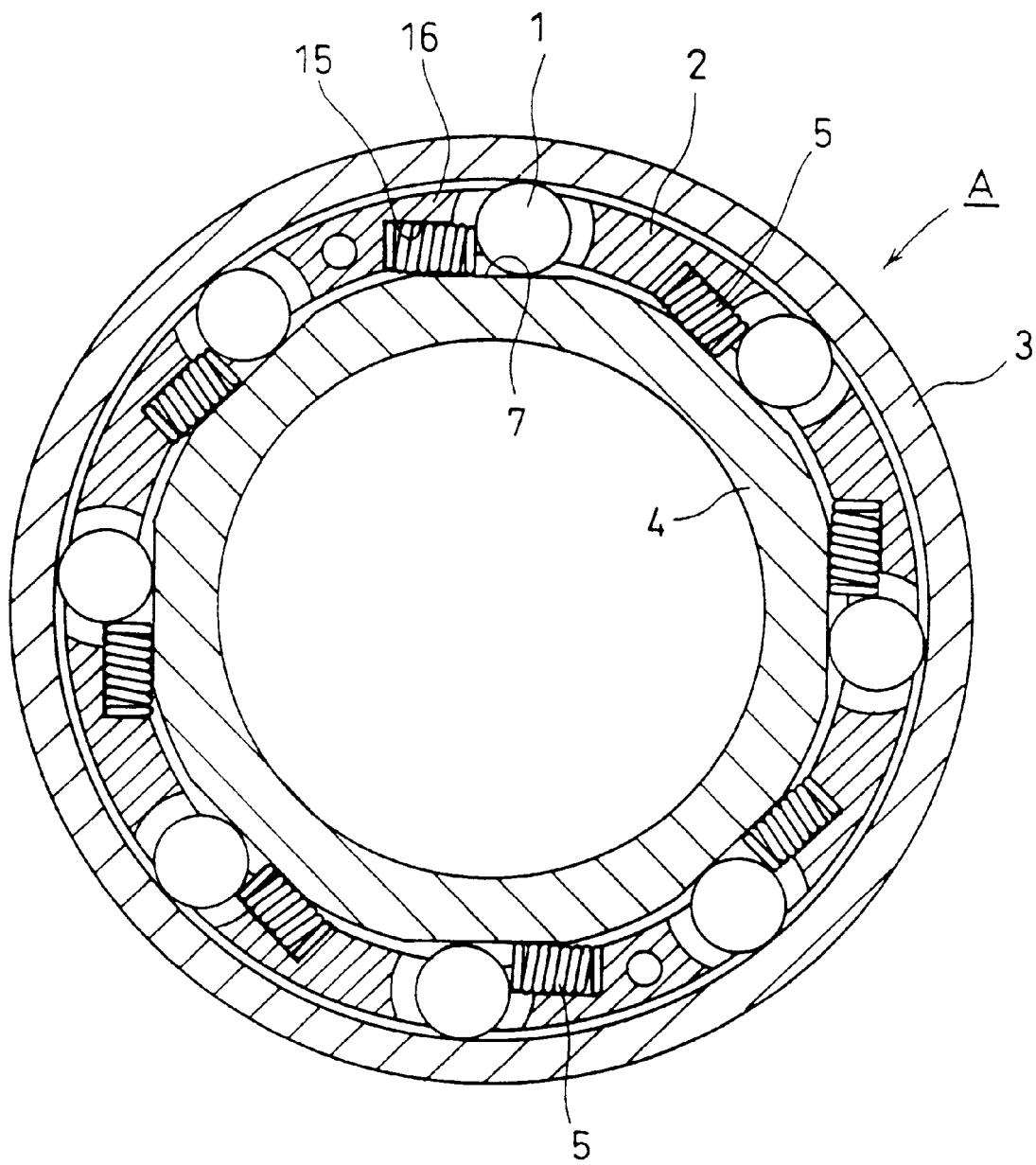

ONE-WAY CLUTCH AND AUXILIARY MACHINE USING THE SAME

BACKGROUND OF THE INVENTION

1. Field of the Invention

This invention relates to a one-way clutch and an auxiliary machine using the same. This one-way clutch is capable of accommodating a pulley to be mounted in the auxiliary machine driven by, for example, a crank shaft of an automobile engine through a belt. As the auxiliary machine, there are a compressor, a water pump, an alternator, a cooling fan and a crank pulley in an air conditioner of an automobile.

2. Description of the Related Art

Generally, a one-way clutch comprises an inner wheel, an outer wheel, a holding device, and a plurality of coil springs. The holding device has a plurality of pockets penetrating from inside to outside in a diameter direction and having a rectangular shape as viewed in plan, the pockets being provided at several positions on a circumference of the holding device. With the holding device sandwiched between the inner wheel and outer wheel, the roller and coil spring are accommodated in a space limited by an inner wall of each pocket, an outer circumference of the inner wheel and an inner circumference of the outer wheel. The coil spring is accommodated in a condition in which it is compressed in a circumferential direction and urges the roller to a locking side (to a narrow side of the aforementioned space) by its expanding restoration force. The coil spring has a general shape that it is wound in a cylindrical shape to obtain its expanding restoration force, and in the space within the pocket, the coil spring is accommodated in a state in which an end portion in the expanding direction is in contact with the intermediate portion in the axial direction.

The accommodated coil spring is likely to be distorted in an unstable shape like a "V" shape as viewed from the top when it urges the roller to the locking side or free side (to a wider side of the aforementioned space) with relative rotating motion between the inner wheel and outer wheel. The distorted coil spring is not capable of providing the roller with an appropriate urging force and further may skew the roller. If any one of the rollers is skewed, an excessive load is applied to end portions of the roller thereby likely causing eccentric abrasion or peeling. Further, the locking and free operations of the roller become unstable, thereby the reliability of the operation of the one-way clutch being reduced.

SUMMARY OF THE INVENTION

Accordingly, a primary object of the present invention is to provide a one-way clutch capable of holding the roller in stable posture within each of the pockets when the coil spring accommodated in the pocket of the holding device is expanded or contracted for urging the roller to the locking side or free side with relative rotating motions between the inner wheel and outer wheel, thereby the reliability of the operation of the one-way clutch being improved.

Other objects, features and advantages of the present invention are apparent in a following description.

To achieve the above object of the invention, the present invention provides a one-way clutch for switching between a locking state in which two inner and outer annular bodies disposed coaxially with each other rotate synchronously and a free state in which they rotate relative to each other, comprising a holding device located between the annular bodies and having a plurality of pockets for accommodating rollers, a plurality of the rollers accommodated in each of the pockets of the holding device, and a plurality of coil springs each accommodated in each of the pockets in a compressed state for urging the roller to a locking side by an expanding restoration force while an end thereof in the expanding direction is in contact with a range of over ½ the width of the roller in the axial direction of the roller. The coil spring presses a relatively wide range of an intermediate portion in the axial direction of the roller to the locking side so as to make the roller easy to rotate smoothly in the pocket with a proper posture.

BRIEF DESCRIPTION OF THE DRAWINGS

These and other objects as well as advantages of the invention will become clear by the following description of preferred embodiments of the invention with reference to the accompanying drawings, wherein:

FIG. 6 is a sectional view of the one-way clutch of FIG. 5; and

In all these figures, like components are indicated by the same numerals.

DETAILED DESCRIPTION OF THE PREFERRED EMBODIMENTS

Figure 1:
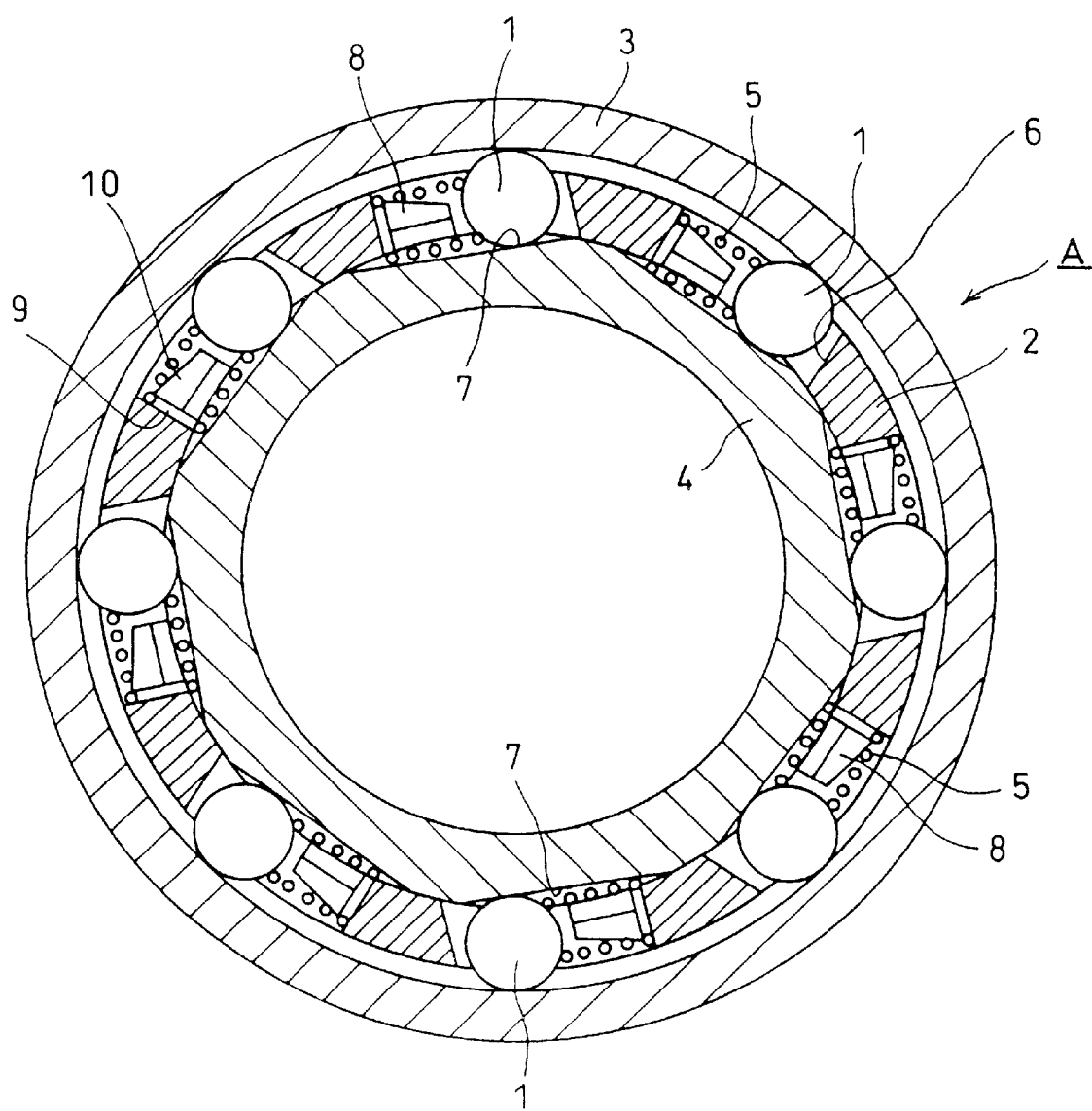
FIG. 1 is a sectional view of a one-way clutch according to a preferred embodiment of the present invention.
Figure 2:
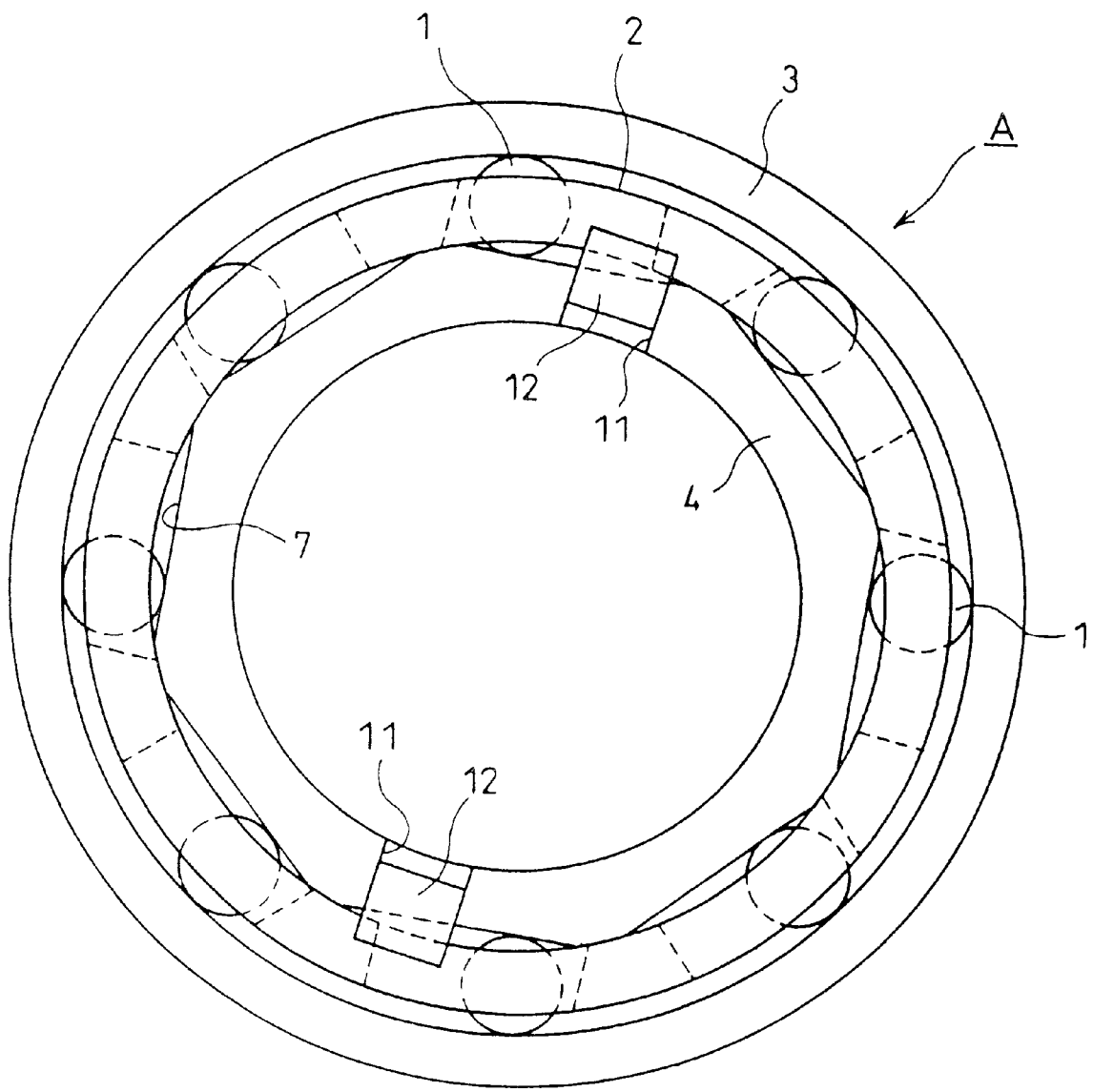
FIG. 2 is a side view of the one-way clutch shown in FIG. 1.

Hereinafter, a preferred embodiment of the present invention will be described with reference to the accompanying drawings.

Referring to FIGS. 1–4, the one-way clutch A according to a preferred embodiment of the present invention comprises a plurality of rollers 1, a holding device 2 in which pockets 6 for each containing a roller are provided at plural positions on a circumference thereof, an outer wheel 3 disposed along an outer circumference of the holding device 2, an inner wheel 4 in which cam surfaces 7 for each forming a wedge-like space are provided at positions corresponding to the pockets 6 of the holding device 2, coil springs 5 which are accommodated in a state in which each of them is compressed in each pocket 6 and urge the rollers 1 to a narrow side namely a locking side of each of the wedge-like space by its expansive restoration force. The cam surface 7 is a flat key-like cutout face. The wedge-like space is formed of a space limited by an inner wall of the pocket 6 of the holding device 2, the cam surface 7 of the inner wheel 4 and an inner circumference of the outer wheel 3.

The roller 1 is accommodated such that it is capable of rotating in a circumferential direction within the pocket 6 of the holding device 2 and deflected to one side in the circumferential direction. In the roller 1, its corners of both ends in the axial direction are chamfered in a rounded shape and an outer surface thereof except those chamfered portions is formed in a cylindrical shape in the axial direction. This cylindrical portion serves for an effective rolling region.

Figure 3:
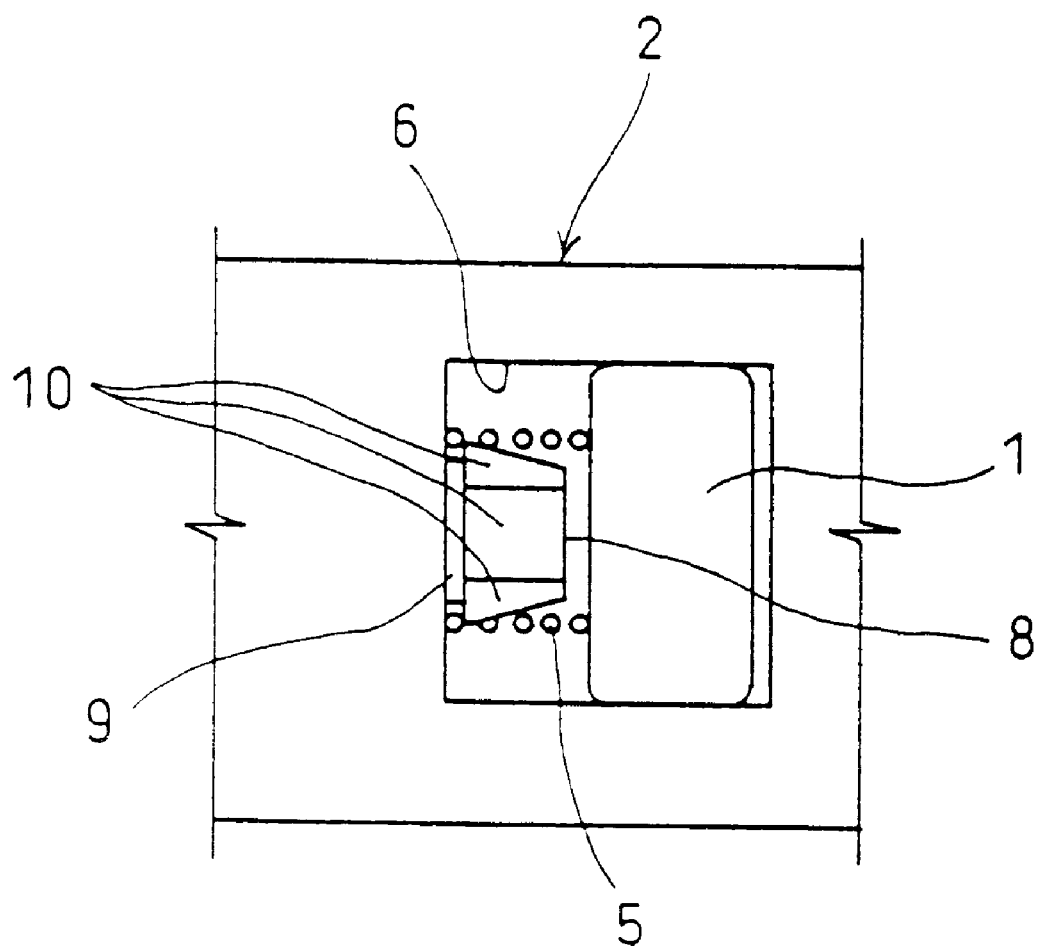
FIG. 3 is a plan development of a roller allocating portion of a holding device of the one-way clutch shown in FIG. 1.
Figure 4:
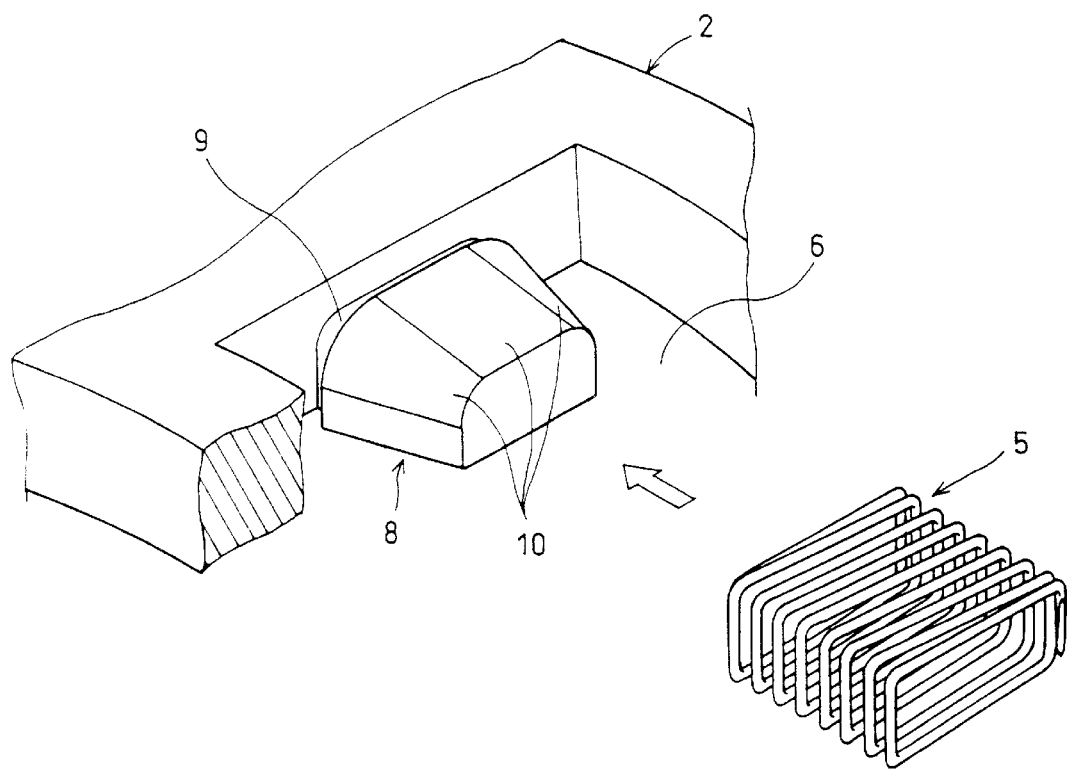
FIG. 4 is a perspective view of a protrusion of the holding device shown in FIG. 3.
Figure 5:
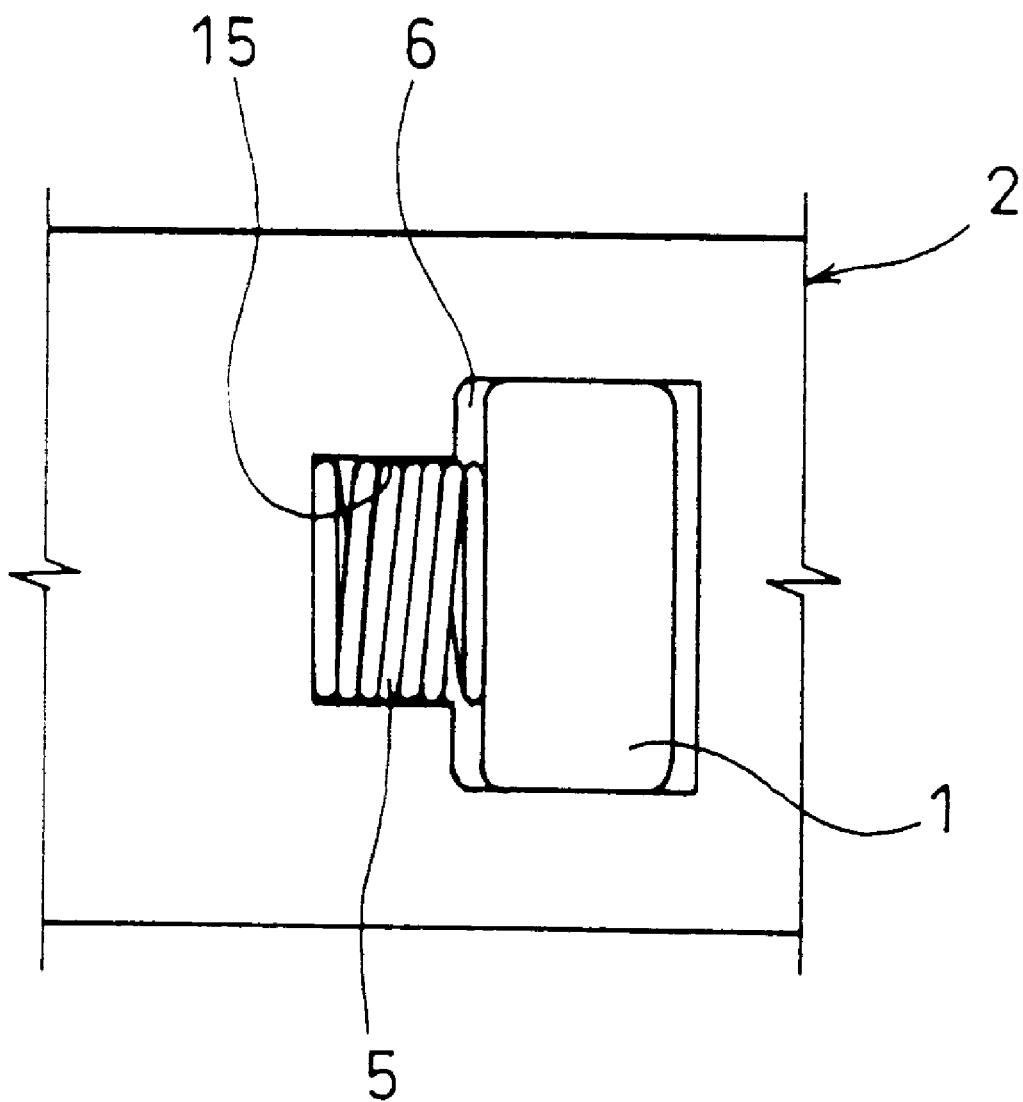
FIG. 5 is a sectional view showing a one-way clutch according to another preferred embodiment of the present invention.

The coil spring 5 is accommodated within the pocket 6 of the holding device 2 such that it is deflected to the other side in the circumferential direction. Its expanding direction is perpendicular to the center axial line of the roller 1 and an end in the expanding direction is in contact with an intermediate portion in the axial direction of the roller 1. The coil spring 5 is disposed substantially in parallel to the flat cam surface 7 of the inner wheel 4. The coil spring 5 is formed in a substantially rectangular shape such that its section in the diameter direction has a short side in the diameter direction and a long side in the axial direction and wound in a rectangular spiral shape in the expanding direction. In the intermediate portion in the axial direction of the roller 1, an end in the expanding direction is in contact with a range or over ½ of the width of the roller in the axial direction, preferably ⅔ of the width of the roller. The range over which points of a coil spring 5 contact a roller 1 across the width of the roller is best shown in FIGS. 3 and 5.

On an inner wall face in which the coil spring 5 is disposed, of the pocket 6 of the holding device 2 is formed a protrusion 8 projecting into the pocket 6 integrally with the inner wall face. The coil spring 5 is mounted on the protrusion 8. The protrusion 8 has a peripheral groove 9 at the root portion thereof. The other end of the coil spring 5 is fit to the peripheral groove 9. An inner circumference of the coil spring 5 is supported by an outer circumference of the protrusion 8. As a result, the coil spring 5 is held integrally with the holding device 2 in a condition that a posture thereof is kept properly. An outer surface of the protrusion 8 has tapered faces 10 for facilitating mounting of the coil spring 5 onto the protrusion 8. The material of the holding device 2 is not restricted to any particular one. The holding device 2 can be produced easily at a low price if it is formed of synthetic resin.

The holding device 2 is fixed to the inner wheel 4. Namely, an end face in the axial direction of the inner wheel 4 is provided with a slit-like concave portion 11 which is open to the axial end and open to inside and outside in the diameter direction thereof. An inner side of an end portion in the axial direction of the holding device 2 is provided with a convex portion 12 which is pressed in and engaged with the concave portion 11 along the axial direction. The holding device 2 is blocked from moving in the circumferential direction and axial direction because the convex portion 12 is pressed in and engaged with the concave portion 11.

An operation of the one-way clutch A will be described.

When the rotation speed of the outer wheel 3 becomes relatively faster than that of the inner wheel 4, the roller 1 is moved to the narrow side of the wedge-like space so that it is locked. As a result, the outer wheel 3 and inner wheel 4 are integrated so that they are rotated synchronously with each other. Thus, a driving power is transmitted between the outer wheel 3 and inner wheel 4. When the rotation speed of the outer wheel 3 becomes relatively slower than that of the inner wheel 4, the roller 1 is moved to a wider side of the wedge-like space so that it is free. As a result, the transmission of the driving power is interrupted.

The coil spring 5 comes into contact with most part of the effective rolling region for the roller 1 because the winding shape thereof is rectangular cylindrical shape. As a result, the urging force of the coil spring 5 is supplied to the roller 1 effectively at a good balance so as to assist a rotation of the roller 1. Further, because the coil spring 5 is held by the protrusion 8 of the holding device 2, a deflection of the coil spring 5 which may be generated during the expanding motion is blocked effectively. As a result, the coil spring 5 is kept in a proper posture during the motion. Consequently, the urging force of the coil spring 5 is supplied to the roller 1 in a stable condition, so that any skew of the roller 1 is avoided effectively, thereby stabilizing the aforementioned locking and free operations.

Because the cam surface 7 is formed on the outer circumference of the inner wheel 4, the behavior of the roller 1 is stabilized even in a situation in which the rotating centrifugal force increases. That is, in a high-speed rotation range in which the rotating centrifugal force increases, the rollers 1 are pressed against the inner circumference of the outer wheel 3. Thus, a phenomenon that part of the rollers 1 become free when all the rollers 1 should be in locking condition can be avoided securely.

Although in the above example, the coil spring 5 is supported by the protrusion 8 of the holding device 2, it is permissible to have such a structure in which as shown in FIG. 5, a concave portion open to inside and outside in the diameter direction and further one way along the circumferential direction is provided in the holding device 5 so as to accommodate the coil spring 5 in this concave portion 15. In this structure also, the coil spring 5 is capable of keeping its posture properly like in the above example. In such a structure, the protrusion 8 can be eliminated from the holding device 2 in FIG. 1. It is also permissible to provide the concave portion 15 with a ceiling 16 on the side of the outer circumference thereof so as to prevent the coil spring 5 from slipping to the outer circumference at the time of assembly. In this case, the width in the diameter direction of the coil spring 5 is desired to be smaller as compared to the shape shown in FIG. 1.

Although in the above example, the cam surface 7 is provided on the inner wheel 4, it is permissible to provide the cam surface 7 on the outer wheel 3.

In the above example, the outer wheel 3 and inner wheel 4 only have to be two outer/inner annular bodies disposed coaxially with each other and the one-way clutch A only has to be a clutch capable of switching between the locking state in which both the annular bodies rotate synchronously and the free state in which they rotate relative to each other.

Figure 7:
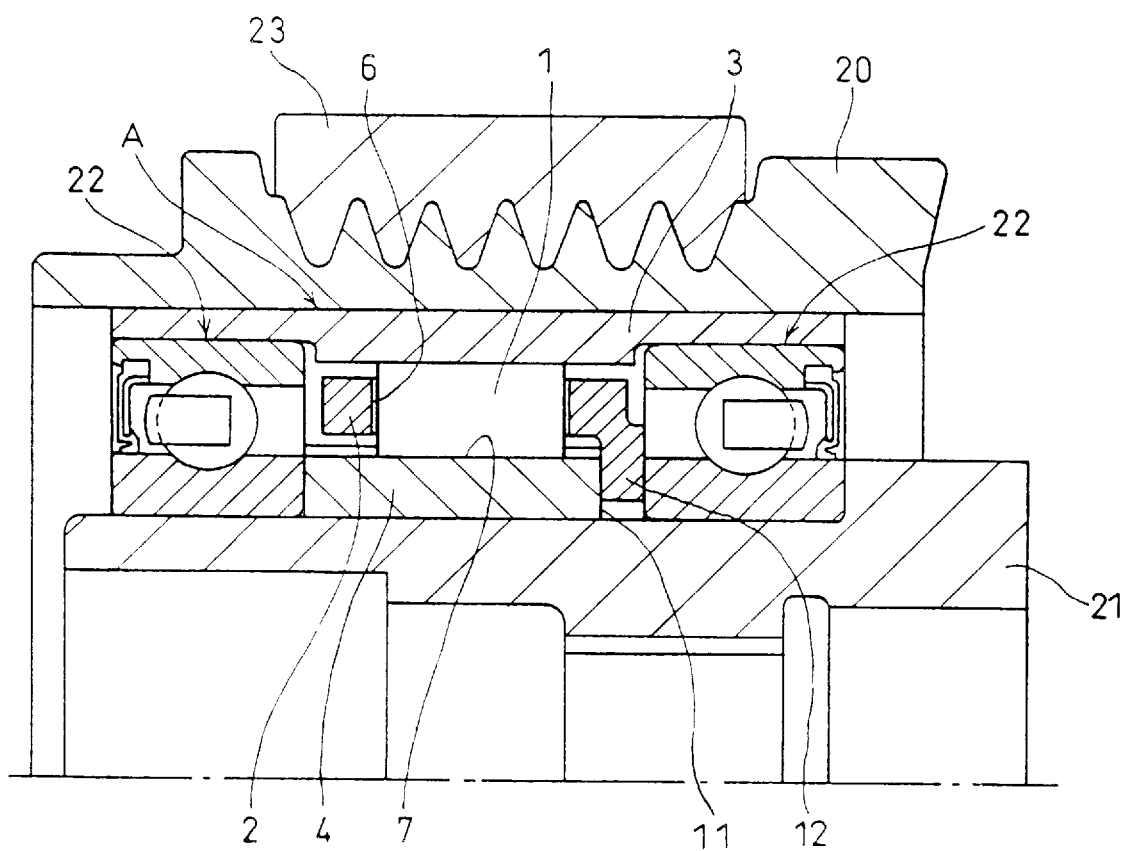
FIG. 7 is a sectional view showing a upper half portion of a pulley unit in an auxiliary machine using the one-way clutch of the present invention.

The one-way clutch A of the present invention can be accommodated in various kinds of auxiliary machines mounted on, for example, an automobile engine. A case in which the auxiliary machine is an alternator will be described with reference to FIG. 7. In this case, the one-way clutch A of the above described embodiment is interposed between the pulley 20 of the alternator and rotor 21 and further, the rolling bearings 22, 22 are disposed on both sides in the axial direction of the one-way clutch A. In this case, the one-way clutch A is switched between the free state and locking state depending on a difference of the rotation between the pulley 20 and rotor 21, so as to transmit a rotation driving power from the pulley 20 to the rotor 21 or interrupt the transmission of the rotation driving power. In a conventional alternator, because the pulley 20 is rotated by a crank shaft of an engine via a belt 23, if the rotation speed of the crank shaft drops, the power generation efficiency of the alternator also drops. However, if the one-way clutch A described above is accommodated, the one-way clutch A can be made to function so as to keep the rotation speed of the rotor 21 in a high-speed range by an inertial force thereof when the rotation speed of the pulley 20 drops, thereby contributing to improvement of the power generation efficiency.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A one-way clutch for switching between a locking state in which two inner and outer annular bodies disposed coaxially with each other rotate synchronously and a free state in which they rotate relative to each other, comprising:

a holding device located between the annular bodies and having a plurality of pockets for accommodating rollers;

a plurality of the rollers, one roller being accommodated in each of the pockets of said holding device; and a plurality of coil springs each accommodated in each of said pockets in a compressed state for urging said roller to a locking side, wherein said holding device is provided with a coil spring alignment portion for positioning each coil spring in an axial direction thereof so as to contact an intermediate portion of a corresponding roller in an axial direction thereof, and said coil spring alignment portion includes a concave portion provided on an inner wall on a side of said pocket in which said coil spring is disposed, an end of said coil spring being accommodated in said concave portion.

2. The one-way clutch as claimed in claim 1, wherein said coil spring is wound in a rectangular spiral shape.

3. The one-way clutch as claimed in claim 1, wherein an end of a coil spring extends along the axial direction of a corresponding roller a distance which is at least ½ of the axial length of said roller.

4. The one-way clutch as claimed in claim 1, wherein said concave portion is open in a circumferential direction.

5. A one-way clutch for switching between a locking state in which two inner and outer annular bodies disposed coaxially with each other rotate synchronously and a free state in which they rotate relative to each other, comprising:

a holding device located between the annular bodies and having a plurality of pockets for accommodating rollers;

a plurality of the rollers, one roller being accommodated in each of the pockets of said holding device; and a plurality of coil springs each accommodated in each of said pockets in a compressed state for urging said roller to a locking side, wherein said holding device is provided with a coil spring alignment portion for positioning each coil spring in an axial direction thereof so as to contact an intermediate portion of a corresponding roller in an axial direction thereof, and said coil spring alignment portion includes a protrusion, the protrusion extending from the surface of a pocket and projecting into an interior of the respective coil spring accommodated in said pocket.

6. The one-way clutch as claimed in 5, wherein said protrusion has a peripheral groove around a root thereof and an end of said coil spring is fit to said peripheral groove.

7. The one-way clutch as claimed in claim 5, wherein said protrusion has tapered faces for mounting said coil spring on the protrusion.

8. A one-way clutch comprising:

an outer wheel having a cylindrical inner circumferential surface;

an inner wheel that is disposed coaxially with the outer wheel at the inner circumferential surface of the outer wheel, an annular space being interposed between the inner and outer wheel;

cam surfaces on the inner wheel, with wedge-shaped spaces being formed between the inner wheel and the outer wheel at a plurality of positions along an outer circumference of the inner wheel;

a holding device that is disposed on the outer circumference of the inner wheel and having a plurality of pockets, a pocket being disposed at regions corresponding to each of the cam surfaces, each pocket passing through a radial extent of the holding device;

a plurality of columnar rollers, one roller being accommodated in each of the pockets of the holding device so as to be rotatable along the periphery of the inner wheel; and a plurality of coil springs, one spring being accommodated in each of said pockets in a compressed state for urging said roller to narrower sides of said wedge-like spaces through expanding restoring force; wherein said holding device is provided with a coil spring alignment portion for positioning each coil spring in an axial direction thereof so as to contact an intermediate portion of each roller in an axial direction thereof, and said coil spring alignment portion includes a concave portion provided on an inner wall on a side of a pocket in which said coil spring is disposed, an end of said coil spring being accommodated in said concave portion.

9. The one-way clutch as claimed in claim 8, wherein said coil spring is wound in a rectangular spiral shape.

10. The one-way clutch as claimed in claim 8, wherein an end of said coil spring extends along the axial direction of said roller a distance which is at least ½ of the axial length of the roller.

11. The one-way clutch as claimed in claim 8, wherein the plurality of cam surfaces formed at the inner wheel are formed as flat surfaces, wherein the shape of the outer circumferential surface of the inner wheel is polygonal, and wherein the coil springs are disposed to be substantially parallel to the flat cam surfaces of the inner wheel.

12. An auxiliary machine comprising:

a rotor;

a one-way clutch interposed between a pulley and said rotor and for transmitting a rotation driving power from said pulley to said rotor, or to interrupt the transmission of the rotation driving power by switching between a free state and a locking state depending on a difference of rotation of said pulley and said rotor; and rolling bearings disposed on both sides in an axial direction of said one-way clutch, wherein said one-way clutch includes: an inner wheel; an outer wheel; a holding device located between said inner wheel and said outer wheel and having a plurality of pockets for accommodating rollers;

a plurality of rollers, one roller accommodated in each of the pockets of said holding device; and a plurality of coil springs each accommodated in each of said pockets in a compressed state for urging said roller to a locking side by an expanding restoration force; wherein a surface of a pocket includes a coil spring alignment portion, the alignment portion inhibiting deflection of a respective coil spring accommodated in said pocket, and said coil spring alignment portion of a pocket includes a protrusion, the protrusion extending from the surface of said pocket and projecting into an interior of the respective coil spring accommodated in said pocket.

13. The auxiliary machine as claimed in claim 12, wherein said coil spring is wound in a rectangular spiral shape.

14. The auxiliary machine as claimed in claim 12, wherein an end of said coil spring extends along the axial direction of said roller a distance which is at least ½ of the axial length of the roller.

15. An auxiliary machine comprising:

a rotor;

a one-way clutch interposed between a pulley and said rotor and for transmitting a rotation driving power from said pulley to said rotor, or to interrupt the transmission of the rotation driving power by switching between a free state and a locking state depending on a difference of rotation of said pulley and said rotor; and rolling bearings disposed on both sides in an axial direction of said one-way clutch, wherein said one-way clutch includes: an inner wheel; an outer wheel; a holding device located between said inner wheel and said outer wheel and having a plurality of pockets for accommodating rollers;

a plurality of rollers, one roller accommodated in each of the pockets of said holding device; and a plurality of coil springs each accommodated in each of said pockets in a compressed state for urging said roller to a locking side by an expanding restoration force; wherein a surface of a pocket includes a coil spring alignment portion, the alignment portion inhibiting deflection of a respective coil spring accommodated in said pocket, and said coil spring alignment portion of a pocket includes a concave portion provided on an inner wall on a side of said pocket in which said coil spring is disposed, an end of said coil spring being accommodated in said concave portion.

16. A one-way clutch for switching between a locking state in which two inner and outer annular bodies disposed coaxially with each other rotate synchronously and a free state in which they rotate relative to each other, comprising:

a holding device located between the annular bodies and having a plurality of pockets for accommodating rollers;

a plurality of the rollers, one roller being accommodated in each of the pockets of said holding device; and a plurality of coil springs each accommodated in each of said pockets in a compressed state for urging said roller to a locking side, wherein said holding device is provided with a coil spring alignment portion for positioning each coil spring in an axial direction thereof so as to contact an intermediate portion of a corresponding roller in an axial direction thereof, and said coil spring alignment portion includes a recess formed in said surface of a pocket, a portion of the coil spring being disposed within said recess.

17. A one-way clutch comprising:

an outer wheel having a cylindrical inner circumferential surface;

an inner wheel that is disposed coaxially with the outer wheel at the inner circumferential surface of the outer wheel, an annular space being interposed between the inner and outer wheel;

cam surfaces on the inner wheel, with wedge-shaped spaces being formed between the inner wheel and the outer wheel at a plurality of positions along an outer circumference of the inner wheel;

a holding device that is disposed on the outer circumference of the inner wheel and having a plurality of pockets, a pocket being disposed at regions corresponding to each of the cam surfaces, each pocket passing through a radial extent of the holding device;

a plurality of columnar rollers, one roller being accommodated in each of the pockets of the holding device so as to be rotatable along the periphery of the inner wheel; and a plurality of coil springs, one spring being accommodated in each of said pockets in a compressed state for urging said roller to narrower sides of said wedge-like spaces through expanding restoring force; wherein said holding device is provided with a coil spring alignment portion for positioning each coil spring in an axial direction thereof so as to contact an intermediate portion of each roller in an axial direction thereof, and said coil spring alignment portion includes a recess formed in the surface of a pocket, a portion of the coil spring being disposed within said recess.

18. An auxiliary machine comprising:

a rotor;

a one-way clutch interposed between a pulley and said rotor and for transmitting a rotation driving power from said pulley to said rotor, or to interrupt the transmission of the rotation driving power by switching between a free state and a locking state depending on a difference of rotation of said pulley and said rotor; and rolling bearings disposed on both sides in an axial direction of said one-way clutch, wherein said one-way clutch includes: an inner wheel; an outer wheel; a holding device located between said inner wheel and said outer wheel and having a plurality of pockets for accommodating rollers;

a plurality of rollers, one roller accommodated in each of the pockets of said holding device; and a plurality of coil springs each accommodated in each of said pockets in a compressed state for urging said roller to a locking side by an expanding restoration force; wherein a surface of a pocket includes a coil spring alignment portion, the alignment portion inhibiting deflection of a respective coil spring accommodated in said pocket, and said coil spring alignment portion of a pocket includes a recess formed in the surface of the pocket, a portion of the coil spring being disposed within said recess.

* * * * *